(12) United States Patent
Park et al.

(10) Patent No.: US 9,224,366 B1
(45) Date of Patent: Dec. 29, 2015

(54) BENDABLE STEREOSCOPIC 3D DISPLAY DEVICE

(71) Applicant: LG DISPLAY CO., LTD., Seoul (KR)

(72) Inventors: JuSeong Park, Goyang-si (KR); JongHee Hwang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/563,328

(22) Filed: Dec. 8, 2014

(30) Foreign Application Priority Data

Aug. 14, 2014 (KR) .......................... 10-2014-0106019

(51) Int. Cl.
*G09G 5/18* (2006.01)
*H04N 13/04* (2006.01)

(52) U.S. Cl.
CPC .............. *G09G 5/18* (2013.01); *H04N 13/0409* (2013.01); *G06F 2203/04102* (2013.01)

(58) Field of Classification Search
CPC ....................................................... G09G 5/18
See application file for complete search history.

(56) References Cited

U.S. PATENT DOCUMENTS

| 2009/0051849 A1* | 2/2009 | Hwang et al. ................... 349/62 |
| 2013/0155052 A1* | 6/2013 | Ko ................. 345/419 |
| 2013/0207946 A1* | 8/2013 | Kim et al. ..................... 345/204 |
| 2014/0306985 A1* | 10/2014 | Jeong et al. ................... 345/601 |

* cited by examiner

*Primary Examiner* — Jason Olson
(74) *Attorney, Agent, or Firm* — Dentons US LLP (57) ABSTRACT

Disclosed is a bendable stereoscopic 3D display device that includes a display panel including a plurality of left-eye pixels and a plurality of right-eye pixels, the display panel being divided into a plurality of blocks; a separator on the display panel to transmit or block images output from the left-eye pixels and the right-eye pixels; a gate driver and a data driver to drive the display panel; a timing controller to receive image data and a timing signal for driving the gate driver and the data driver; and a control unit to receive a bending information on at least one of the plurality of blocks when there is a change in curvature of the display panel, reset a view map of the at least one of the plurality of blocks based on the bending information, and rearrange the image data based on the view map.

17 Claims, 10 Drawing Sheets

| 16 | 4 | 8 | 12 | 16 | 4 | 8 | 12 | 16 | 4 | 8 | 12 | 16 | 4 | 8 | 12 |
|----|---|---|----|----|---|---|----|----|---|---|----|----|---|---|----|
| 15 | 3 | 7 | 11 | 15 | 3 | 7 | 11 | 15 | 3 | 7 | 11 | 15 | 3 | 7 | 11 |
| 14 | 2 | 6 | 10 | 14 | 2 | 6 | 10 | 14 | 2 | 6 | 10 | 14 | 2 | 6 | 10 |
| 13 | 1 | 5 | 9 | 13 | 1 | 5 | 9 | 13 | 1 | 5 | 9 | 13 | 1 | 5 | 9 |
| 12 | 16 | 4 | 8 | 12 | 16 | 4 | 8 | 12 | 16 | 4 | 8 | 12 | 16 | 4 | 8 |
| 11 | 15 | 3 | 7 | 11 | 15 | 3 | 7 | 11 | 15 | 3 | 7 | 11 | 15 | 3 | 7 |
| 10 | 14 | 2 | 6 | 10 | 14 | 2 | 6 | 10 | 14 | 2 | 6 | 10 | 14 | 2 | 6 |
| 9 | 13 | 1 | 5 | 9 | 13 | 1 | 5 | 9 | 13 | 1 | 5 | 9 | 13 | 1 | 5 |
| 8 | 12 | 16 | 4 | 8 | 12 | 16 | 4 | 8 | 12 | 16 | 4 | 8 | 12 | 16 | 4 |
| 7 | 11 | 15 | 3 | 7 | 11 | 15 | 3 | 7 | 11 | 15 | 3 | 7 | 11 | 15 | 3 |
| 6 | 10 | 14 | 2 | 6 | 10 | 14 | 2 | 6 | 10 | 14 | 2 | 6 | 10 | 14 | 2 |
| 5 | 9 | 13 | 1 | 5 | 9 | 13 | 1 | 5 | 9 | 13 | 1 | 5 | 9 | 13 | 1 |
| 4 | 8 | 12 | 16 | 4 | 8 | 12 | 16 | 4 | 8 | 12 | 16 | 4 | 8 | 12 | 16 |
| 3 | 7 | 11 | 15 | 3 | 7 | 11 | 15 | 3 | 7 | 11 | 15 | 3 | 7 | 11 | 15 |
| 2 | 6 | 10 | 14 | 2 | 6 | 10 | 14 | 2 | 6 | 10 | 14 | 2 | 6 | 10 | 14 |
| 1 | 5 | 9 | 13 | 1 | 5 | 9 | 13 | 1 | 5 | 9 | 13 | 1 | 5 | 9 | 13 |

FIG. 8B

| 2 | 6 | 10 | 14 | 1 | 5 | 9 | 13 | 16 | 4 | 8 | 12 | 15 | 3 | 7 | 11 | 14 | 2 | 6 | 10 |
|---|---|----|----|---|---|---|----|----|---|---|----|----|---|---|----|----|---|---|----|

| 2 | 6 | 10 | 14 | 1 | 5 | 9 | 13 | 16 | 4 | 8 | 12 | 15 | 3 | 7 | 11 |
|---|---|----|----|---|---|---|----|----|---|---|----|----|---|---|----|
| 1 | 5 | 9 | 13 | 16 | 4 | 8 | 12 | 15 | 3 | 7 | 11 | 14 | 2 | 6 | 10 |
| 16 | 4 | 8 | 12 | 15 | 3 | 7 | 11 | 14 | 2 | 6 | 10 | 13 | 1 | 5 | 9 |
| 15 | 3 | 7 | 11 | 14 | 2 | 6 | 10 | 13 | 1 | 5 | 9 | 12 | 16 | 4 | 8 |
| 14 | 2 | 6 | 10 | 13 | 1 | 5 | 9 | 12 | 16 | 4 | 8 | 11 | 15 | 3 | 7 |
| 13 | 1 | 5 | 9 | 12 | 16 | 4 | 8 | 11 | 15 | 3 | 7 | 10 | 14 | 2 | 6 |
| 12 | 16 | 4 | 8 | 11 | 15 | 3 | 7 | 10 | 14 | 2 | 6 | 9 | 13 | 1 | 5 |
| 11 | 15 | 3 | 7 | 10 | 14 | 2 | 6 | 9 | 13 | 1 | 5 | 8 | 12 | 16 | 4 |
| 10 | 14 | 2 | 6 | 9 | 13 | 1 | 5 | 8 | 12 | 16 | 4 | 7 | 11 | 15 | 3 |
| 9 | 13 | 1 | 5 | 8 | 12 | 16 | 4 | 7 | 11 | 15 | 3 | 6 | 10 | 14 | 2 |
| 8 | 12 | 16 | 4 | 7 | 11 | 15 | 3 | 6 | 10 | 14 | 2 | 5 | 9 | 13 | 1 |
| 7 | 11 | 15 | 3 | 6 | 10 | 14 | 2 | 5 | 9 | 13 | 1 | 4 | 8 | 12 | 16 |
| 6 | 10 | 14 | 2 | 5 | 9 | 13 | 1 | 4 | 8 | 12 | 16 | 3 | 7 | 11 | 15 |
| 5 | 9 | 13 | 1 | 4 | 8 | 12 | 16 | 3 | 7 | 11 | 15 | 2 | 6 | 10 | 14 |
| 4 | 8 | 12 | 16 | 3 | 7 | 11 | 15 | 2 | 6 | 10 | 14 | 1 | 5 | 9 | 13 |
| 3 | 7 | 11 | 15 | 2 | 6 | 10 | 14 | 1 | 5 | 9 | 13 | 16 | 4 | 8 | 12 |

BENDABLE STEREOSCOPIC 3D DISPLAY DEVICE

CROSS-REFERENCE TO RELATED APPLICATION

This application claims the benefit of Korean Patent Application No. 10-2014-0106019, filed on Aug. 14, 2014, which is hereby incorporated by reference for all purposes as if fully set forth herein.

BACKGROUND OF THE INVENTION

1. Field of the Invention

The present invention relates to a stereoscopic three-dimensional (3D) display device, and more particularly, to a bendable stereoscopic 3D display device and method for driving the same.

2. Discussion of the Related Art

A three-dimensional (3D) display may be simply defined as an entire system that artificially reproduces 3D images. The system typically includes both software that creates image content in a 3D fashion and hardware that actually implements the image content created by the software into 3D images. In other words, the separate image content in software is typically required to realize 3D images in the 3D display.

A virtual 3D display (hereinafter, referred to as "stereoscopic 3D display device") is an entire system that allows humans to virtually and stereoscopically view an image output from flat panel display hardware using the principle of binocular disparity. Binocular disparity is caused by the fact that human eyes are spaced apart from each other by about 65 mm in a horizontal direction, which is one of various factors that allow humans to perceive a 3D effect.

In other words, because of binocular disparity, when a human views an object, the two eyes of the human see slight different images (properly speaking, having slight different left and right spatial information). As such, when the two images are transferred to the brain through the retina, the brain accurately combines the two images, and thereby the human can perceive a 3D effect. Accordingly, a stereoscopic 3D display device is a system in which a virtual 3D effect is obtained based on binocular disparity through a design in which two left and right images are simultaneously displayed on a 2D display device and transferred to the human's eyes.

In order to display images of two channels on a single screen in such a stereoscopic 3D display device, the images of two channels are typically output one channel by one channel while lines are changed one line by one line on the screen in one of horizontal and vertical directions. In the case of a glassless method, when the images of two channels are simultaneously output from one display device, the right image is directly viewed only by the right eye and the left image is directly viewed only by the left eye. On the other hand, in the case of a method of wearing glasses, the right image is blocked so that it is not viewed by the left eye, and the left image is blocked so that it is not viewed by the right eye.

As described above, binocular disparity caused due to an interval between the human's eyes is one of the important factors that allow humans to perceive a 3D effect and depth perception, along with psychological and memorial factors.

Methods for realizing stereoscopic displays are typically classified into a volumetric type, a holographic type and a stereoscopic type depending on the extent of 3D image information given to a viewer.

The volumetric type is a method that allows humans to feel perspective with respect to a depth direction due to a psychological factor and an inhalation effect. The volumetric type has been applied to a 3D computer graphic that displays perspective, superimposition, a shadow and light and shade, motion, and the like by calculation or so-called IMAX theater that provides a large screen having a wide viewing angle to a viewer and causes an optical illusion as if the viewer were drawn into the space.

A 3D expression method, which has been known as the most perfect stereoscopic image realization method, may be represented by laser beam reproduction holography or white light reproduction holography.

Also, the 3D expression method allows humans to perceive a 3D effect due to a physiological factor of both eyes. As described above, the 3D expression method uses an ability that the brain generates spatial information in front of and behind a display surface in the course of combining these images to perceive a 3D effect, that is, stereography when associated images of a flat panel including disparity information are viewed by the left and right eyes that are spaced apart from each other by about 65 mm. Such a 3D expression method is broadly classified into a method that wears glasses and a glassless method that does not wear glasses.

A lenticular lens method and a parallax barrier method are the known representative methods that do not wear glasses. The lenticular lens method uses a lenticular lens plate that includes cylindrical lenses vertically arranged and is installed in front of a display panel.

In these glassless stereoscopic 3D display devices, even when a stereoscopic shape of the flexible display panel is deformed, 3D images in the flat panel state are maintained identically. Accordingly, 3D images on the bendable display panel may not be implemented or the 3D effect of images may be degraded. In other words, because 3D images are implemented based on the initially designed view map, the viewer can view 3D images when he or she enters a fixed viewing zone.

In an ideal case, an appropriate viewing position of a viewer and the number of viewers are estimated, and desired 3D images are viewed when the viewer's eyes are in a view-diamond of a specific location. However, when the display panel, which is designed based on the initial estimation of the appropriate viewing position, is bent, images do not progress in an intended direction and thus, image separation is not made properly. For example, superimposition of the desired view and other view images may occur, leading to a 3D cross-talk perceived by the viewer.

SUMMARY OF THE INVENTION

Accordingly, the present invention is directed to a bendable stereoscopic 3D display device and method for driving the same that substantially obviates one or more of the problems due to limitations and disadvantages of the related art.

An advantage of the present invention is to provide a bendable stereoscopic 3D display device and method for driving the same that can reduce a 3D cross-talk.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a bendable stereoscopic 3D display device may, for example, include a display panel including a plurality of left-eye pixels and a plurality of right-eye pixels, the display panel being divided into a plurality of blocks; a separator on the display panel to transmit or block images output from the left-eye pixels and the right-eye pixels; a gate driver and a data driver to drive the display panel; a timing controller to receive image data and a timing signal for driving the gate driver and the data driver; and a control unit to receive a bending information on at least one of the plurality of blocks when there is a change in curvature of the display panel, reset a view map of the at least one of the plurality of blocks based on the bending information, and rearrange the image data based on the view map.

In another aspect of the present invention, a method for driving a bendable stereoscopic 3D display device that has a display panel including a plurality of left-eye pixels and a plurality of right-eye pixels, the display panel being divided into a plurality of blocks, and a separator on the display panel to transmit or block images output from the left-eye pixels and the right-eye pixels, the method may, for example, include receiving a bending information on at least one of the plurality of blocks of the display panel, when there is a change in curvature of the display panel; resetting a view map of the at least one of the plurality of blocks based on the bending information; and rearranging image data based on the view map.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 8A and 8B are views schematically showing 16-view image arrangement written to a display panel;

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

Figure 1:
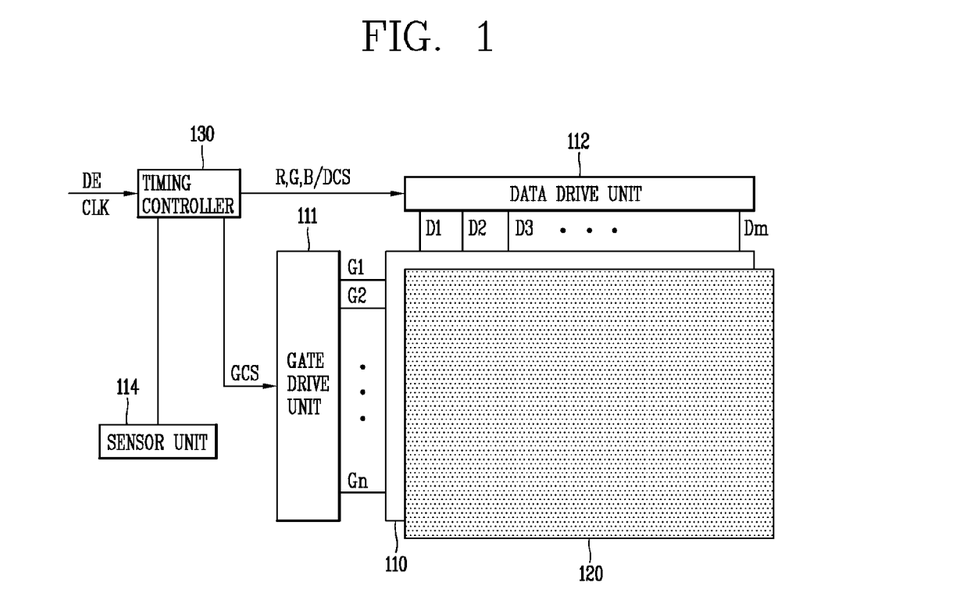
FIG. 1 is a block diagram illustrating a configuration of a bendable stereoscopic 3D display device according to an embodiment of the present invention.
Figure 2:
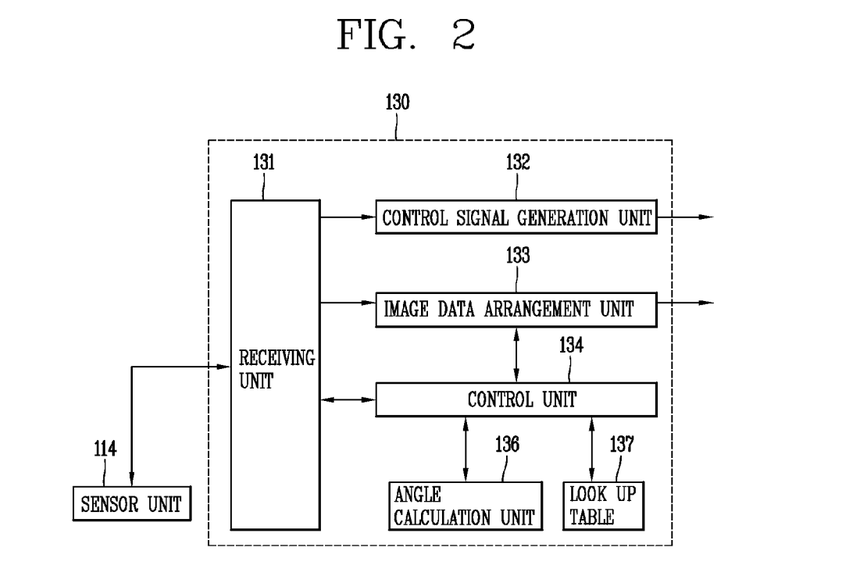
FIG. 2 is a block diagram illustrating an internal configuration of a timing controller in the bendable stereoscopic 3D display device illustrated in FIG. 1.

FIG. 1 is a block diagram illustrating a configuration of a bendable stereoscopic three-dimensional (3D) display device according to an embodiment of the present invention. FIG. 2 is a block diagram illustrating an internal configuration of a timing controller in the bendable stereoscopic 3D display device illustrated in FIG. 1.

Referring to FIG. 1, a bendable stereoscopic 3D display device according to an embodiment of the present invention may include a display panel 110 having a plurality of left-eye pixels and right-eye pixels formed thereon, a barrier panel 120 (or a separator) disposed in front of the display panel 110 to transmit or block left-eye images and right-eye images output from the left-eye pixels and right-eye pixels, a timing controller 130 to reset a view map and rearrange image data depending on a change in curvature of the display panel 110, a gate drive unit 111 to apply scan pulses to gate lines G1, G2, . . . , and Gn of the display panel 110, and a data drive unit 112 to apply digital image data signals R, G and B to data lines D1, D2, . . . , and Dm of the display panel 110.

In addition, the bendable stereoscopic 3D display may further include a sensor unit 114 to detect a change in curvature of the display panel 110 to extract bending information.

The bendable stereoscopic 3D display device may be implemented as a flat panel display device such as a liquid crystal display (LCD), an organic light emitting diode display (OLED), a field emission display (FED), a plasma display panel (PDP), an electroluminescent display (EL), or the like. A flexible display of the LCD or OLED is used as the display panel 110 in the disclosed embodiments, but the present invention is not limited thereto.

The flexible display may be a lightweight and unbreakable display that can be bent or curved like paper, and may be manufactured on a thin and flexible substrate while maintaining display characteristics of the existing flat panel display.

An electronic paper may also be used for the flexible display in addition to the above-described LCD or OLED. The electronic paper, which is also referred to as e-paper, is of a display to which characteristics of a typical ink and paper are applied. The electronic paper uses reflected light similar to typical paper and may maintain a formed image and/or text without additionally supplying power once the image and/or text are/is formed, which is different from the conventional flat panel display that typically shoots backlight on the pixels.

As described above, the display panel 110 is provided with a plurality of pixels in which red, green and blue colors are displayed. The plurality of pixels are divided into left-eye pixels and right-eye pixels to display left-eye images and right-eye images, respectively, for displaying stereoscopic images, along with the barrier panel 120.

For example, when an LCD is used for the display panel 110, various modes of LCD can be applied to the present invention, examples of which are a twisted nematic (TN)

mode, an in plane switching (IPS) mode, a fringe field switching (FFS) mode, and a vertical alignment (VA) mode.

Although not shown, the display panel 110 may mainly include a color filter substrate, an array substrate, and a liquid crystal layer formed between the color filter substrate and the array substrate.

The color filter substrate may include a color filter including a plurality of sub-color filters to implement colors such as red, green and blue, a black matrix (BM) to divide one sub-color filter from another sub-color filter and block light transmitted from the liquid crystal layer, and a transparent common electrode used to apply a voltage to the liquid crystal layer.

The array substrate may include a plurality of gate lines G1, G2, . . . , and Gn and a plurality of data lines D1, D2, D3, . . . , and Dm that may be arranged in horizontal and vertical directions, respectively, and define a plurality of pixel regions, thin film transistors (TFTs) that are switching devices formed near the crossings between the gate lines G1, G2, . . . , and Gn and the data lines D1, D2, D3, and Dm, and pixel electrodes formed in the pixel regions.

The thin film transistors may include gate electrodes that are electrically connected to the gate lines G1, G2, . . . , and Gn, source electrode that are electrically connected to the data lines D1, D2, D3, . . . , and Dm, and drain electrodes that are electrically connected to the pixel electrodes. In addition, the thin film transistors may include a gate insulating film for insulating the gate electrode from the source and drain electrodes, and an active layer to form a conductive channel between the source electrode and the drain electrode by a gate voltage supplied to the gate electrode.

An upper polarizing plate is attached to an outer surface of the color filter substrate, and a lower polarizing plate is attached to an outer surface of the array substrate. Light transmission axes of the upper and lower polarizing plates may be formed to be orthogonal to each other.

Also, alignment layers are formed on inner surfaces of the color filter substrate and the array substrate so as to set a pre-tilt angle of the liquid crystal layer, while a spacer is formed between the color filter substrate and the array substrate so as to maintain a cell gap between the two substrates.

On the other hand, when the OLED is used for the display panel 110, an anode made of a transparent oxide is formed on a substrate made of plastic or stainless steel, and a hole transport layer, an emission layer, an electron transport layer, an electron injection layer, and a cathode may be sequentially stacked on the anode.

In such an OLED, holes injected from the anode and electrons injected from the cathode are combined in the emission layer via the hole and electron transport layers transporting the holes and electrons, respectively, and then light of a wavelength corresponding to the energy difference in the emission layer is typically generated, with the electrons and holes moving back to the lower energy levels.

The display panel 110 may display images under control of the timing controller 130. The display panel 110 may display a multi-view image in a 3D mode under control of the timing controller 130. In this case, the multi-view image may mean first to nth (n is a natural number equal to or more than 2) view image.

For a stereoscopic image view, images may be generated in such a way that cameras are separated from one another at an interval between both eyes and the cameras photograph an object. For example, when an object is photographed using four cameras, the display panel 110 may display a 4-view stereoscopic image.

The timing controller 130 may receive a timing signal such as a data enable signal DE, a dot clock CLK, or the like, and generate control signals GCS and DCS for controlling operation timings of the gate drive unit 111 and the data drive unit 112.

The data drive unit 112 may include a plurality of source drive ICs. The source drive ICs may convert image data R, G and B input from the timing controller 130 into positive and negative analog data voltages using positive or negative gamma compensation voltages. The positive and negative analog data voltages output from the source drive ICs are supplied to the data lines D1, D2, D3, . . . , and Dm of the display panel 110.

The gate drive unit 111 may include a shift register, a level shifter that converts an output signal of the shift register to have a swing width suitable for driving the TFTs in the liquid crystal cell, and an output buffer. The gate drive unit 111 may sequentially supply the gate pulse synchronized with the data voltages to the gate lines G1, G2, . . . , Gn of the display panel 110 under control of the timing controller 130.

The timing controller 130 may drive the display panel 110 at a predetermined frame frequency based on the image data received from a multi-view image conversion unit (not shown) and generate the gate drive unit control signal GCS and the data drive unit control signal DCS based on the predetermined frame frequency. The timing controller 130 may supply the gate drive unit control signal GCS to the gate drive unit 111 and supply the image data R, G and B and the data drive unit control signal DCS to the data drive unit 112.

The gate drive unit control signal GCS may include a gate start pulse, a gate shift clock, and a gate output enable signal. The gate start pulse may control a timing of a first gate pulse. The gate shift clock may be a clock signal for shifting the gate start pulse. The gate output enable signal may control an output timing of the gate drive unit 111.

The data drive unit control signal DCS may include a source start pulse, a source sampling clock, a source enable signal, and a polarity control signal. The source start pulse may control a data sampling start time of the data drive unit 112. The source sampling clock may be a clock signal used to control a sampling operation of the data drive unit 112 based on a rising or falling edge. When digital image data input to the data drive unit 112 is transferred in a mini low voltage differential signaling (LVDS) interface standard, the source start pulse and the source sampling clock may be omitted. The polarity control signal may invert a polarity of the data voltage output from the data drive unit 112 at an L (L is a natural number) horizontal period cycle. The source output enable signal may control an output timing of the data drive unit 112.

When the sensor unit 114 detects a change in curvature of the display panel 110, the timing controller 130 may perform a function of resetting the view map based on the bending information of the display panel 110 and rearranging the image data. This function of the timing controller 130 will now be described in detail with reference to FIG. 2.

Although a method for driving a bendable stereoscopic 3D display device according the present invention will now be described as a function of the timing controller 130 as illustrated in FIG. 2, the present invention is not limited thereto. In other words, a separate control unit, which may include a receiving unit 131, a look up table (LUT) 137, an angle calculation unit 136 and a control unit 134, may be used to implement a driving method of the present invention.

As illustrated in FIG. 2, the timing controller may include the receiving unit 131 to receive image data from a broadcast system or the like and various types of timing signals such as DE and CLK, a control signal generation unit 132 to generate and output control signals using the timing signals received from the receiving unit 131, an image data arrangement unit 133 to arrange the image data received from the receiving unit 131 or rearrange and output the image data depending on a degree of bending when a curvature of the display panel 110 is changed, the angle calculation unit 136 to calculate a bending angle using the bending information of the display panel 110 extracted by the sensor unit 114, the control unit 134 to reset a view map based on the bending angle calculated by the angle calculation unit 136 and then rearrange the image data through the image data arrangement unit 133, and the look up table 137 to store optimal view maps in connection with appropriate positions of a viewer and degrees of bending of the display panel 110.

First, the receiving unit 131 may receive the image data and the timing signals, transmit the timing signals to the control signal generation unit 132, and transmit the image data to the image data arrangement unit 133 as described above.

Next, the control signal generation unit 132 may generate control signals GCS and DCS to control operation timings of the gate drive unit 111 and the data drive unit 112 using the timing signals received from the receiving unit 131 as described above.

The image data arrangement unit 133 may arrange the received image data according to characteristics of the display panel 110 and transmit the image data to the data drive unit 112. In addition, when a curvature of the display panel 110 is changed, the image data arrangement unit 133 may rearrange the image data through the control unit 134 depending on a degree of bending of the display panel 110 and transmit the rearranged image data to the data drive unit 112.

However, the control unit 134 may rearrange the image data and directly transmit the image data to the data drive unit 112. In this case, the image data arrangement unit 133 may not transmit the image data to the data drive unit 112 according to an output stop control signal received from the control unit 134.

Next, the angel calculation unit 136 may calculate a bending angle using the bending information of the display panel 110 extracted by the sensor unit 114.

The look up table 137 may store optimal view maps in connection with appropriate positions of the viewer and degrees of bending of the display panel 110. In this case, the control unit 134 may reset the view map using the look up table 137 according to the bending angle calculated by the angle calculation unit 136 and then rearrange the image data through the image data arrangement unit 133.

For example, the control unit 134 may divide the display panel 110 into a plurality of blocks to analyze a stereoscopic shape of the display panel 110 based on an electrical change generated by the sensor unit 114 and then calculate a degree of bending for each block through the angle calculation unit 136. The control unit 134 may reset the view of one of the blocks to another view based on the view map stored in the look up table 137 and then rearrange the image data through the image data arrangement unit 133. As a result, even when the display panel 110 is bent, a 3D cross-talk due to superimposition of another view image may be significantly reduced or prevented.

When the display panel 110 is bent, the sensor unit 114 provided on one surface of the display panel 110 is also bent. For example, sensor electrodes in the sensor unit 114 are supplied with a certain voltage through electrode interconnections. When the display panel 110 is bent, electrostatic capacities of the sensor electrodes are, for example, changed.

In particular, as the specific block is positioned such that the bending of the display panel 110 is greater, distances among the sensor electrodes in the block are more reduced. In other words, as the degree of bending of the display panel 110 is greater, the sensor electrodes in the block are closer to one another so that electrostatic capacities of the sensor electrodes in the block are increased. The angle calculation unit 136 may calculate the degree of bending of the display panel 110 for a block using or measuring an amount of change in electrostatic capacities in the block of the display panel 110. Therefore, a 3D stereoscopic shape of the display panel 110 may be determined by using or measuring an amount of change in electrostatic capacities of the sensor electrodes in each block.

As described above, because the sensor unit 114 according to an embodiment of the present invention is installed at one surface of the display panel 110 and bent integrally with the display panel 110, the bending of the display panel 110 can be sensed. Further, the sensor unit 114 is provided such that the bending of the display panel 110 can be sensed for each block. As a result, more accurate bending information can be extracted for each block of the display panel 110, and thus more accurate view map can be reset.

A view map may refer to coordinate information of a viewing region that can view a stereoscopic image output from a stereoscopic 3D display device according to the present invention. Such a viewing region may include a normal viewing region, a reverse viewing region and a viewing impossible region.

The normal viewing region is a region in which a viewer can normally view a stereoscopic image and in which a right-eye image is viewed by the right eye of the viewer and a left-eye image is viewed by the left eye of the viewer. The reverse viewing region is a region in which the viewer stereoscopically recognize an image because of different information between the images transmitted, but the eyes of the viewer feel fatigue more quickly because a left-eye image is viewed by the right eye of the viewer and a right-eye image is viewed by the left eye of the viewer. The viewing impossible region is a region in which the viewing of a stereoscopic image is impossible.

In other words, a view map may include coordinate information on various positions for the above-described three regions. However, because the viewing impossible region is the remainder of the normal viewing region and the reverse viewing region, the coordinate information on the viewing impossible region in the view map may be omitted.

The barrier panel 120 is a medium through which an image path is optically divided, and may form a light transmitting region and a light block region that respectively transmit or block left-eye images and right-eye images output from left-eye pixels and right-eye pixels of the display panel 110.

Figure 3:
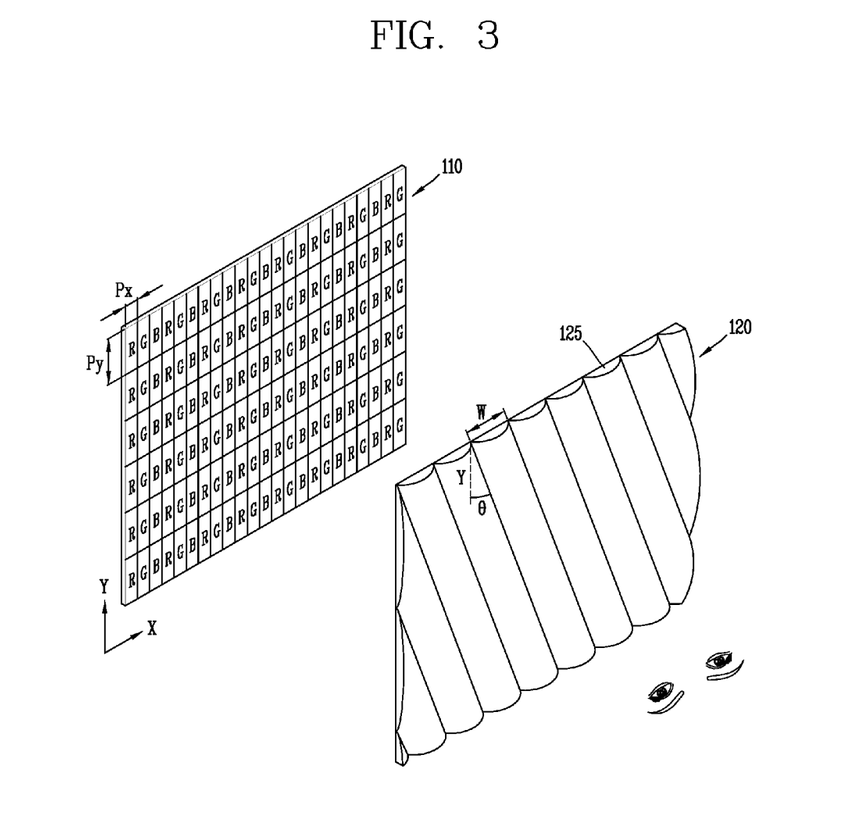
FIG. 3 is a perspective view illustrating a lenticular lens type stereoscopic 3D display device according to an embodiment of the present invention.

The barrier panel 120 may be variously configured based on the following lenticular lens or already known technologies. FIG. 3 is a perspective view illustrating a lenticular lens type stereoscopic 3D display device according to an embodiment of the present invention.

Referring to FIG. 3, the lenticular lens type stereoscopic 3D display device includes a lenticular lens plate 120 that has a plurality of lenticular lenses 125 with a predetermined width w and is disposed in front of the display panel 110 in which a plurality of sub-pixels R, G and B are disposed.

The lenticular lens plate 120 may be formed on a flat substrate such that the upper surface thereof is provided with a material layer of a convex lens shape.

The lenticular lens plate 120 may divide left-eye images from right-eye images, and a view diamond (normal viewing region), in which the left-eye images and the right-eye images normally reach the left eye and the right eye, respectively, is formed at an appropriate 3D viewing distance from the lenticular lens plate 120. As a result, an image from the display panel 110 passing through the lenticular lens plate 120 is finally viewed by the left eye and the right eye of the viewer along with the other image group. Thus, a 3D stereoscopic image is viewed by the viewer.

In the lenticular lens type stereoscopic 3D display device, the display panel 110 and the lenticular lens plate 120 are separated from each other at a predetermined interval (a rear surface distance) and supported by a fixing member (not shown).

The plurality of lenticular lenses 125 are arranged in an inclined shape with a first angle θ with respect to a vertical direction (a y axis direction) of the sub-pixels R, G and B. In addition, a horizontal width w of the lenticular lenses 125 along a horizontal direction (an x axis direction) of the sub-pixels R, G and B may be set to an integer times a width of the sub-pixels R, G and B. In other words, in the lenticular lens type stereoscopic 3D display device, the lenticular lenses 125 provided in the lenticular lens plate 120 may be arranged so as to be inclined at the first angle θ with respect to the vertical direction of the sub-pixels R, G and B.

As a result, a number of views for 3D image viewing may be adjusted by the inclined arrangement of the lenticular lens plate 120 with respect to the display panel 110 that displays a 2D image.

In the lenticular lens plate 120, the first angle θ that is inclined with respect to the vertical direction of the sub-pixels R, G and B of the lenticular lenses 125 may be expressed as the following equation:

$$\tan^{-1}((M \times Pa)/(N \times Pb)),$$

wherein Pa is a short axis pitch of the sub-pixels R, G and B, Pb is a long axis pitch of the sub-pixels R, G and B, and M and N are an arbitrary natural number and defined as a number of sub-pixels R, G and B in the horizontal direction of the sub-pixels R, G and B and a number of sub-pixels R, G and B in the vertical direction of the sub-pixels R, G and B within one group in case where the lenticular lens 125 penetrates through vertexes of the one group accurately in a diagonal direction, provided that the lenticular lenses 125 has a plurality of sub-pixels R, G and B as the one group. M and N typically satisfy a value of M/N≤2.

In this case, a number assigned to the plurality of sub-pixels R, G and B that are positioned within the one group becomes the number of views that are defined as a region in which the 3D image viewing of the stereoscopic 3D display device, in which the lenticular lenses 125 of the lenticular lens plate 120 are disposed to be inclined at the first angle θ, is possible, and a number assigned to each view becomes the sub-pixels R, G and B seen at the time of the 3D image viewing in each view region.

The stereoscopic 3D display device including the lenticular lens plate 120 as described above may improve luminance and viewing angle for 3D image viewing due to an increase in number of views.

As described above, such an increase in number of views is attained by applying a structure in which the lenticular lenses 125 provided in the lenticular lens plate 120 have a slanted structure with a predetermined angle with respect to a vertical direction of the sub-pixels R, G and B. Degradation of resolution in one direction may also be reduced or prevented by applying such a slanted structure.

In such a configuration, a multi-view image conversion unit may receive image data and a view control signal from a host system. The multi-view image conversion unit may determine the number of views for the stereoscopic image depending on the view control signal. The multi-view image conversion unit may also convert the image data in accordance with the number of views determined by the view control signal.

The host system may supply the image data and the timing signals to the multi-view image conversion unit through interfaces such as a low voltage differential signaling (LVDS) interface and a transition minimized differential signaling (TMDS) interface. The host system may supply the 3D image data including the left-eye image data and the right-eye image data to the multi-view image conversion unit. As described above, the timing signals may include a vertical synchronization signal, a horizontal synchronization signal, a data enable signal and a dot clock.

The host system may receive viewer sensing information from a viewer sensing apparatus and calculate the optimal number of views based on the viewer sensing information. The host system may generate a view control signal according to the optimal number of views and supply the view control signal to the multi-view image conversion unit. The host system may receive the optimal number of views as an input address, generate the view control signal using a look up table, and output the number of views stored in the corresponding input address.

On the other hand, when the display panel of a glassless type stereoscopic 3D display device is bent, the curvature of a center portion rarely changes. As such, the center portion may maintain the existing optical profile. However, the curvatures of the other portions change, and thus the optical profiles thereof also change depending on the bending angle of the display panel. As such, superimposition of views may occur.

Figure 4:
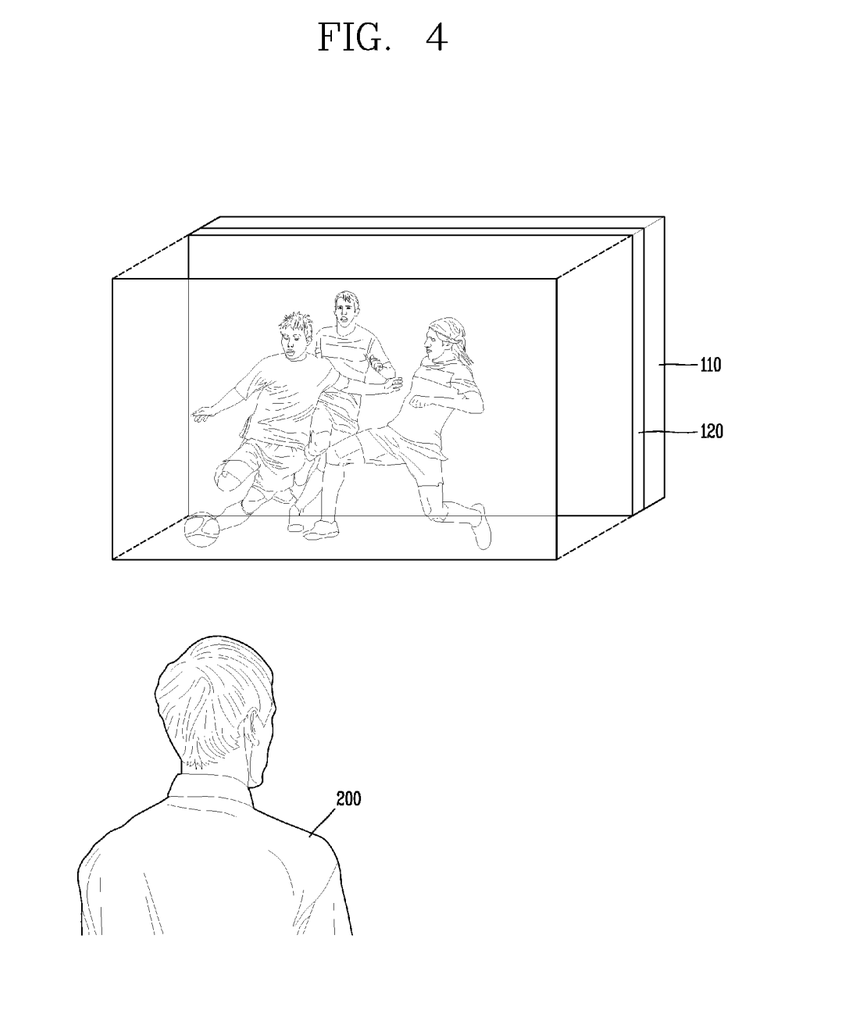
FIG. 4 is a perspective view illustrating a 3D image viewing from a display panel of a bendable stereoscopic 3D display device in a flat panel state according to an embodiment of the present invention.
Figure 5:
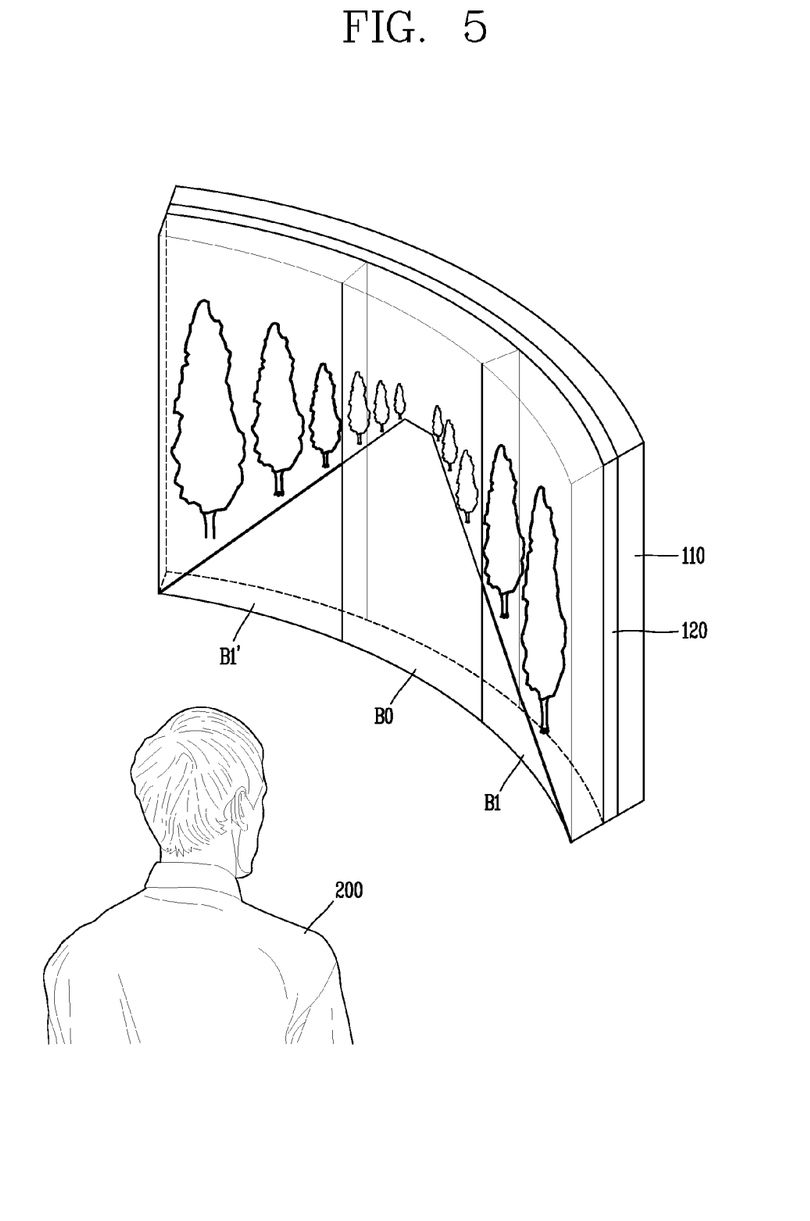
FIG. 5 is a perspective view illustrating a 3D image viewing from a display panel of a bendable stereoscopic 3D display device in a curved panel state according to an embodiment of the present invention.
Figure 6:
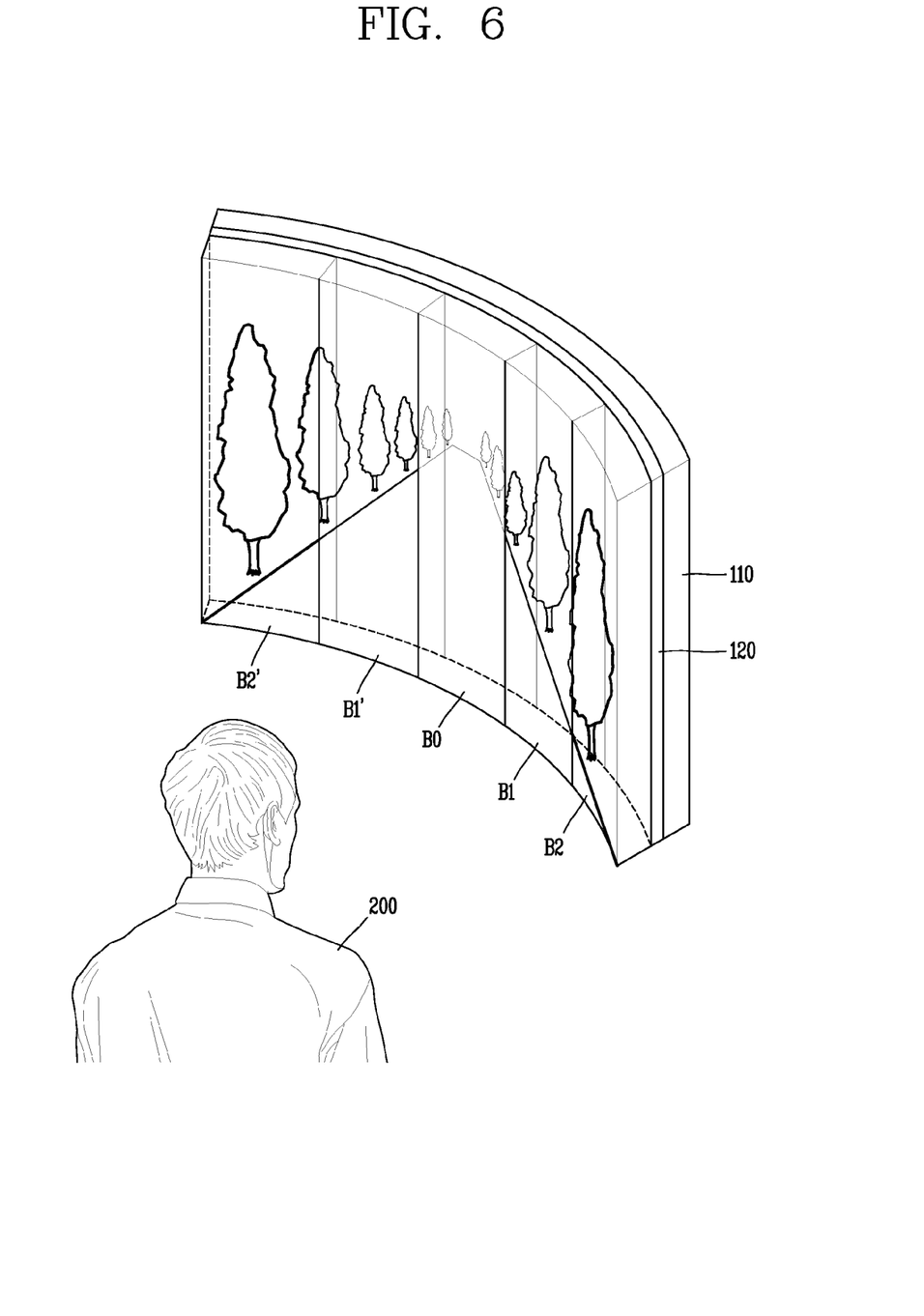
FIG. 6 is a perspective view illustrating a 3D image viewing from a display panel of a bendable stereoscopic 3D display device in a curved panel state according to another embodiment of the present invention.

FIG. 4 is a perspective view illustrating a 3D image viewing from a display panel of a bendable stereoscopic 3D display device in a flat panel state according to an embodiment of the present invention. FIGS. 5 and 6 are perspective views illustrating a 3D image viewing from a display panel of a bendable stereoscopic 3D display device in a curved panel state according to embodiments of the present invention.

FIGS. 4 to 6 illustrate 3D images projected in front of the display panels, but this is intended to facilitate understanding. However, 3D images are in fact not projected, and viewers viewing these 3D images may recognize as if these 3D images are projected in front of the display panels. In addition, FIG. 5 illustrates a case in which the display panel is divided into three blocks, that is, middle, left and right blocks, and FIG. 6 illustrates a case in which the display panel is divided into total five blocks, that is, a middle block and two pairs of left and right blocks as an example. However, the present invention is not limited to the above-described number of blocks, and the display panel may be divided into an arbitrary number of blocks.

Referring to FIG. 4, which illustrates a flat panel state, the display panel 110 including a flexible display provides a 3D image to a viewer 200 in the same manner as in a typical 3D display.

The barrier panel 120 may be installed at a front surface of the display panel 110 as a medium that optically separates an image path. Also, a sensor unit (not shown), which detects a change in curvature of the display panel 110 and extracts the bending information, may be installed at a front surface of the display panel 110.

Conventionally, even when the display panel 110 is bent, image data is arranged in the same manner as in the existing flat panel state and provided to the viewer 200. This causes a problem in that a 3D image of the stereoscopic 3D display device may not be implemented or a 3D effect of the image may be degraded.

Referring to FIGS. 5 and 6, a bendable stereoscopic 3D display device according to an embodiment of the present invention is characterized in that, while maintaining the existing optical design by interlocking with the bending information of the display panel 110, the display panel 110 is divided into a plurality of blocks, for example, B0, B1, B1', B2, and B2', the view map is reset based on a degree of bending for each of blocks B0, B1, B1', B2, and B2', and then the image data is rearranged, thereby reducing a 3D cross-talk due to superimposition of view images, which may be caused by the bending of the display panel 110.

In other words, even when the display panel 110 is bent, a light separation effect caused by the existing barrier panel 120 continues to be effective. As such, when the view map (a rule of image data arrangement) is modified to rearrange the image data so that an entire view information of the display panel 110 substantially matches the view information of a reference block (e.g., the middle block), the 3D cross-talk due to superimposition of view images can be reduced and the quality of 3D images can be improved.

When there is a change in curvature of the screen of the display panel 110, a viewing angle of the viewer 200 for each position of the screen is changed. Thus, the same modification of the view map throughout the entire screen may not compensate for this. Accordingly, the display panel 110 according to an embodiment of the present invention may be divided into a certain number of blocks, for example, B0, B1, B1', B2, and B2', and the view map is modified depending on a degree of bending for each of blocks B0, B1, B1', B2, and B2', thereby more accurately and efficiently readjusting the view map to compensate for the bending of the display panel 110.

The degree of bending for each of blocks B0, B1, B1', B2, and B2' may be measured by a bending sensor method in which sensor electrodes having a line shape are added to front and rear surfaces of the display panel 110. The bending sensor method may calculate a degree of bending for each block by calculating a phase deviation of the signals that is caused by a change in resistance of the sensor electrodes occurring at a time when the curvature of each block changes. The bending sensor method may derive the bending information of the display panel 110 using other types of sensors that can detect various pieces of information.

The sensor electrodes are installed at front and rear surfaces of the display panel 110 for each of blocks B0, B1, B1', B2, and B2', and the bending levels are increased as the blocks are further away from the middle block B0. In this way, the bending angle (i.e., the degree of bending) can be calculated for each of blocks B0, B1, B1', B2, and B2'.

In other words, the sensor electrodes are installed at the front and rear surfaces of the display panel 110 in a line shape for each of blocks B0, B1, B1', B2, and B2', the bending levels are accumulated from the middle block B0 as the blocks are further away from the middle block B0, and the degree of bending for each of blocks B0, B1, B1', B2, and B2' can be calculated. Thus, an accurate bending information can be extracted for each of blocks B0, B1, B1', B2, and B2' of the display panel 110.

Referring to FIG. 5, the display panel 110 according to an embodiment of the present invention may be divided into three blocks B0, B1, and B1'. Specifically, the display panel 110 has at least one reference region (here, the middle block B0), with the two first blocks B1 and B1' adjacent to the middle block B0.

The reference region may be used to calculate the bending angle of each of blocks B0, B1, and B1'. In this case, the middle block B0 having a flat panel state may be set as the reference region.

The right first block B1 may be bent with respect to the middle block B0 at a positive angle, whereas the left first block B1' may be bent with respect to the middle block B0 at a negative angle. In addition, the first blocks B1 and B1' may be bent at the same angle or different angles. However, the present invention is not limited thereto, and one of ordinary skill in the art would appreciate that various modifications and variations are possible without departing from the scope of the present invention.

Referring to FIG. 6, the display panel 110 according to an embodiment of the present invention may be divided into five blocks B0, B1, B1', B2, and B2'. Specifically, the display panel 110 has at least one middle block B0 as a reference region and two sets of first blocks B1 and B1' and second blocks B2 and B2' may be set in a direction away from the middle block B0. However, the present invention is not limited to the above-described numbers of blocks. For explaining purposes, a case in which the display panel 110 is divided into total five blocks B0, B1, B1', B2, and B2' will now be described as an example.

The right first block B1 and second block B2 may be bent with respect to the middle block B0 at a positive angle, whereas the left first block B1' and second block B2' may be bent with respect to the middle block B0 at a negative angle.

The right and left first blocks B1 and B1' may be bent at the same angle or different angles. Further, the right and left second blocks B2 and B2' may be bent at the same angle or different angles. However, the present invention is not limited thereto, and one of ordinary skill in the art would appreciate that various modifications and variations are possible without departing from the scope of the present invention.

In this example, the display panel 110 is bent to be concave toward the viewer 200 will be described, but the present invention is not limited thereto. For example, the display panel 110 may be bent to be convex toward the viewer 200. In addition, the left and right sides of the display panel 110 may be bent in different directions. In other words, one side may be bent to be convex toward the viewer 200, whereas the other side may be bent to be concave toward the viewer 200.

The image data may be rearranged so that an entire view information of the display panel 110 substantially matches the view information of the middle block B0 by newly modifying the view map using the view map stored in the look up table based on the degree of bending for each of blocks B0, B1, B1', B2, and B2'.

For example, the number of views in the first blocks B1 and B1' adjacent to the middle block B0 may be modified to be greater or less than that of the middle block B0, and the number of views in the second blocks B2 and B2' adjacent to the first blocks B1 and B1' may be modified to be greater or less than those of the first blocks B1 and B1'. The number of views in each block may be modified so that the view information of the first and second blocks B1, B1', B2, and B2' substantially matches the view information of the middle block B0 in view of their bending angles. Also, the image data in the first blocks B1 and B1' and the second blocks B2 and B2' may be rearranged so that the view information of the first and second blocks B1, B1', B2, and B2' substantially matches the view information of the middle block B0 in view of their bending angles.

The view map may be a set of index values that spatially map glassless content in the display panel 110 according to each view so as to meet design criteria of the glassless type stereoscopic 3D display device. In a typical stereoscopic 3D display device of the glassless method, there is a single view map that is used throughout the entire region of the display panel 110. Each number in the view map may be the number of views for the glassless content to be mapped to the corresponding sub-pixel position.

Hereinafter, a driving method for a stereoscopic 3D display device according to an embodiment will be described in detail with reference to FIGS. 7 to 10. For explanation purposes, a case in which the display panel is divided into total five blocks B0, B1, B1', B2, and B2' will now be described as an example. However, the present invention is not limited thereto, and one of ordinary skill in the art would appreciate that various modifications and variations are possible without departing from the scope of the present invention.

Figure 7:
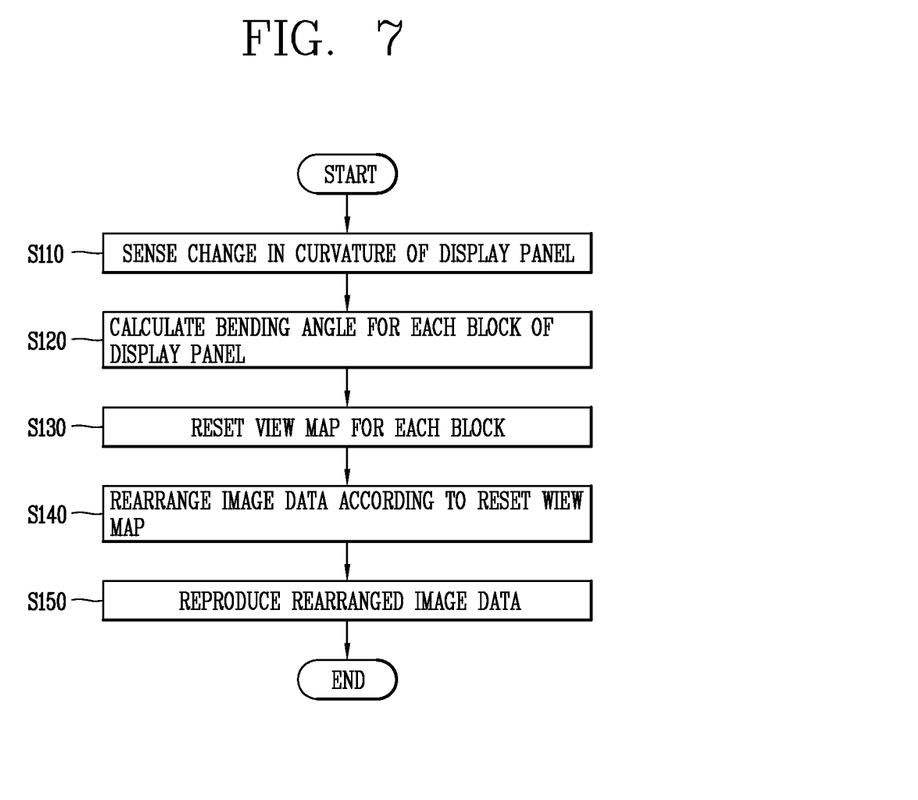
FIG. 7 is a flowchart sequentially illustrating a driving method for a bendable stereoscopic 3D display device according to an embodiment of the present invention.

FIG. 7 is a flowchart sequentially illustrating a method for driving a bendable stereoscopic 3D display device according to an embodiment of the present invention.

FIGS. 8A and 8B are views schematically illustrating a 16-view image arrangement written to a display panel. In particular, FIG. 8A schematically illustrates a 16-view image arrangement written to the display panel before a view map is reset, and FIG. 18B schematically illustrates a 16-view image arrangement written to the display panel after the view map is reset.

Figure 9:
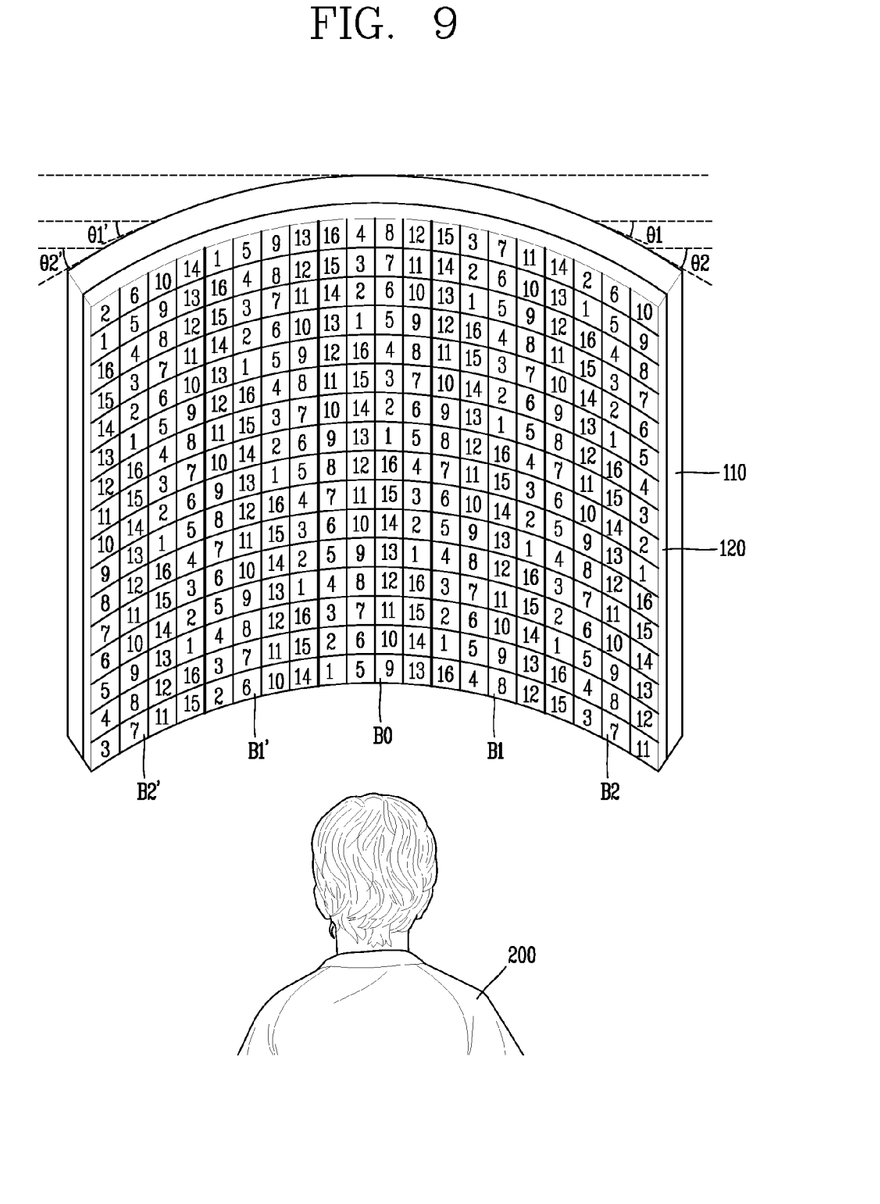
FIG. 9 is a view illustrating an exemplary method of resetting a view map for each block.

FIG. 9 is a view illustrating an exemplary method of resetting a view map for each block. In particular, FIG. 9 illustrates a result after an optimal view map is calculated and applied to each block of the display panel in a glassless type stereoscopic 3D display device having 16 views.

Herein, a view map corresponding to a range of −3° to 3° (e.g., a map of a middle block B0) may be a flat panel criteria view map, and an optimal view map for each angle may be stored in the look up table every time when an angle is changed in a certain range.

Also, FIGS. 10A to 10D are views illustrating an exemplary view map reset for each block in accordance with an embodiment of the present invention. In particular, FIGS. 10A, 10B, 10C and 10D illustrate resetting of view maps for a right first block B1, a right second block B2, a left first block B1', and a left second block B2', respectively, by way of example.

In order for the viewer 200 to recognize stereoscopic images from a stereoscopic 3D display device, left and right images, that is 2-view images, are to be viewed by the left eye and right eye of the viewer 200, respectively.

For a glassless type stereoscopic 3D display device that does not require special stereoscopic image glasses, a 3D viewing region that can view stereoscopic images is limited by an optical path. Thus, in order to extend the 3D viewing region, image content including a plurality of views may be required. In other words, as the number of views increases, the 3D viewing region that can view stereoscopic images is widened. The number of views may be determined by a manufacturer of a stereoscopic 3D display device.

Hereinafter, a stereoscopic 3D display device according an embodiment of the present invention that uses 16 views will be described as an example. However, the present invention is not limited thereto.

First, image data and various types of timing signals such as DE and CLK may be received to a host system from a broadcast system through a receiving unit. The host system may convert the image data of a 2D/3D input image into a format according to a resolution of the display panel 110 using a scaler and transmit the timing signals to a timing controller along with the image data. The host system may be implemented as any one of a television (TV) system, a set-top box navigation system, a DVD player, a Blu-ray player, a personal computer (PC), a home theater system, a phone system, or the like.

A 3D data formatter may be installed between the host system and the timing controller. The 3D data formatter may arrange left-eye and right-eye image data of a 3D image input from the host system in a 3D mode in a multi-view image data format like what is illustrated in FIG. 9 and transmit the image data to the timing controller. In other words, the 3D data formatter may execute a preset 2D-3D image conversion algorithm when 2D image data is input in a 3D mode, generate left-eye and right-eye image data from the 2D image data, arrange the data in the multi-view image data format, and transmit the data to the timing controller.

The host system may supply a 2D image to the timing controller in a 2D mode, whereas it may supply 3D image or 2D image data to a 3D data formatter in a 3D mode. The host system may transmit a mode signal to the timing controller in response to a user data input through a user interface and switch an operation mode of a glassless type stereoscopic 3D display device between a 2D mode and a 3D mode. The user interface may be implemented as a keypad, a keyboard, a mouse, an on-screen display (OSD), a remote controller, a graphic user interface (GUI), a touch user interface (UI), a voice recognition UI, a 3D UI, or the like.

The user may select a 2D mode and a 3D mode through the user interface and select a 2D-3D image conversion operation in the 3D mode.

The host system or the timing controller may determine a viewing zone in which the right eye and the left eye of the viewer 200 are positioned, a moving direction and a moving distance of the viewer 200 by comparing a position of the viewer 200 sensed by a viewing distance sensing unit with viewing zone position information stored in a look up table.

As described above, FIGS. 8A and 8B schematically illustrate a 16-view image arrangement written to a pixel array of the display panel 110 in a multi-view image. In FIGS. 8A and 8B, '1' indicates a first view image, '2' indicates a second view image, and '3' indicates a third view image.

A lenticular lens or barrier applied to the barrier panel 120 may be disposed in a diagonal direction of the display panel 110. In this case, pixel data of the multi-view image are written to pixels in a diagonal direction parallel with the lenticular lens or barrier.

For dark quadrangular emphasized images, an image in which the right-eye of the viewer 200 recognizes when the right-eye of the viewer 200 is positioned in the first viewing zone is illustrated as an example.

Therefore, when the display panel 110 maintains a flat panel state, if the right-eye of the viewer 200 is positioned in the first viewing zone, as illustrated in FIG. 8A, the right-eye of the viewer 200 may view only the pixels that display the first view image '1'.

On the other hand, when there is a change in curvature of the display panel 110, the optical profile also changes according to the bending angle of the display panel 110. As such, superimposition between views may occur. In other words, the right-eye of the viewer 200 may view the pixels that display other view images in addition to the first view image '1'.

To address such a superimposition problem, a sensor unit is provided to detect a change in curvature of the display panel 110 (S110). When a change in curvature of the screen of the display panel 110 occurs, an angle with respect to the viewer 200 may be changed for each position. Therefore, the display panel 110 according to an embodiment of the present invention is divided into a certain number of blocks B0, B1, B1', B2, and B2', and the degree of bending is determined for each of block B0, B1, B1', B2, and B2'.

The blocks B0, B1, B1', B2, and B2' may be set in a certain unit in a horizontal direction of the display panel 110, and sub-blocks that segment in a vertical or horizontal direction of the display panel 110 may be set additionally. In this case, the view map can be reset more accurately through the segmented sub-blocks, thereby further improving image quality.

For example, the degree of bending for each of blocks B0, B1, B1', B2, and B2' may be measured by a bending sensor method in which sensor electrodes having a line shape are provided on front and rear surfaces of the display panel 110.

Referring to FIG. 9, the display panel 110 may be divided into a plurality of blocks B0, B1, B1', B2, and B2'. Specifically, at least one block B0 may be set in a middle position of the display panel 110, and two first blocks B1 and B1' and second blocks B2 and B2' may be set in a direction away from the middle block B0.

The right first block B1 and second block B2 are bent with respect to the middle block B0 at positive angles $\theta 1$ and $\theta 2$, whereas the left first block B1' and second block B2' are bent with the middle block B0 at negative angles $\theta 1'$ and $\theta 2'$.

For example, a case in which the right first block B1 and second block B2 are bent with respect to the middle block B0 at an angle $\theta 1$ of 3° to 6° and an angle $\theta 2$ of 6° to 9°, and the left first block B1' and second block B2' are bent with respect to the middle block B0 at an angle $\theta 1'$ of −6° to −3° and an angle $\theta 2'$ of −9° to −6° is exemplified.

The right first block B1 and the left first block B1' may be bent at the same angle or different angles. Furthermore, the right second block B2 and the left second block B2' may be bent at the same angle or different angles. However, the present invention is not limited thereto.

As described above, the display panel 110 is bent to be convex toward the viewer 200. But the present invention is not limited thereto, and for example, the display panel 110 may be bent to be concave toward the viewer 200. Furthermore, the left and right sides of the display panel 110 may be bent in different directions, meaning that one side may be bent to be convex toward the viewer 200, whereas the other side may be bent to be concave toward the viewer 200.

The bending angle $\theta 1, \theta 1'; \theta 2$, and $\theta 2'$ is calculated for each of blocks B0, B1, B1', B2, and B2' through the angle calculation unit based on the bending information of the display panel 110 extracted by the sensor unit for each of blocks B0, B1, B1', B2, and B2' (S120).

For example, the bending angle $\theta 1, \theta 1'; \theta 2$, and $\theta 2'$ may be calculated for each of blocks B0, B1, B1', B2, and B2' by accumulating bending levels from the middle block B0. Next, the control unit resets the view map for each of blocks B0, B1, B1', B2, and B2' based on the bending angle $\theta 1, \theta 1'; \theta 2$, and $\theta 2'$ calculated by the angle calculation unit, and then rearrange the image data through the image data arrangement unit (S130 and S140).

In other words, when a curvature of the display panel 110 changes, the image data arrangement unit may rearrange the image data depending on the degree of bending of the display panel 110 through the control unit and transmit the image data to the data drive unit.

In this case, the control unit may reset the view map using the look up table based on the bending angle $\theta 1, \theta 1'; \theta 2$, and $\theta 2'$ calculated by the angle calculation unit, and then rearrange the image data through the image data arrangement unit. The look up table may store optimal view maps in connection with appropriate positions of the viewer 200 and degrees of bending of the display panel 110.

The control unit may rearrange the image data and directly transmit the image data to the data drive unit. In this case, the image data arrangement unit may not transmit the image data to the data drive unit when an output stop control signal is received from the control unit.

For example, after the view map is reset, in the view maps of blocks B1, B1', B2, and B2' other than the middle block B0, the other images (e.g., second view image '2', third view image '3' . . . fifteenth view image '15', and sixteenth view image '16') except for the first view image '1' are written to the pixels, as illustrated in FIG. 8B. However, since the display panel 110 has been bent, although the other images ('2', '3' . . . '15', and '16') are written to the pixels, only the first view image '1' may be actually viewed by the right eye of the viewer 200.

Figure 10A:
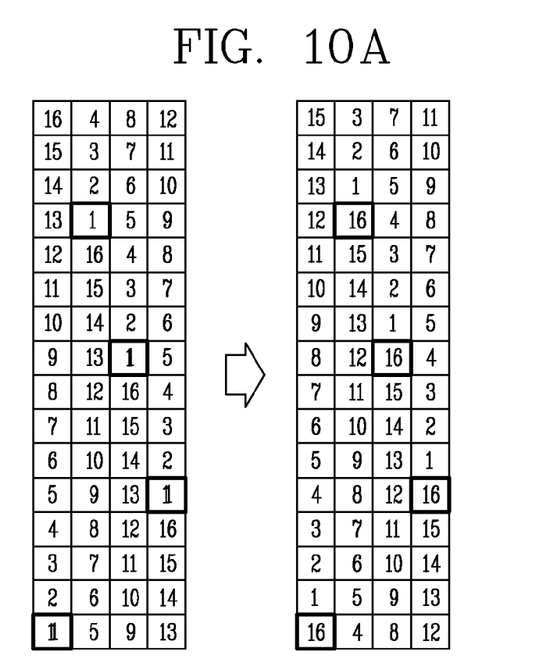
FIGS. 10A to 10D are views illustrating an exemplary view map reset for each block in accordance with an embodiment of the present invention.
Figure 10B:
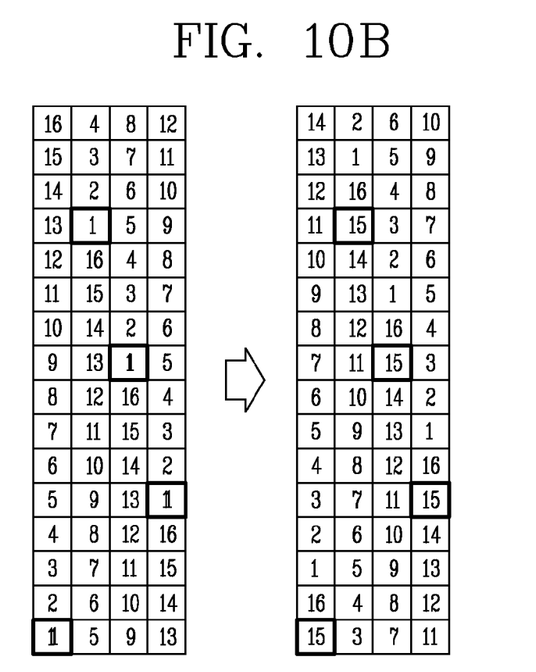
Figure 10C:
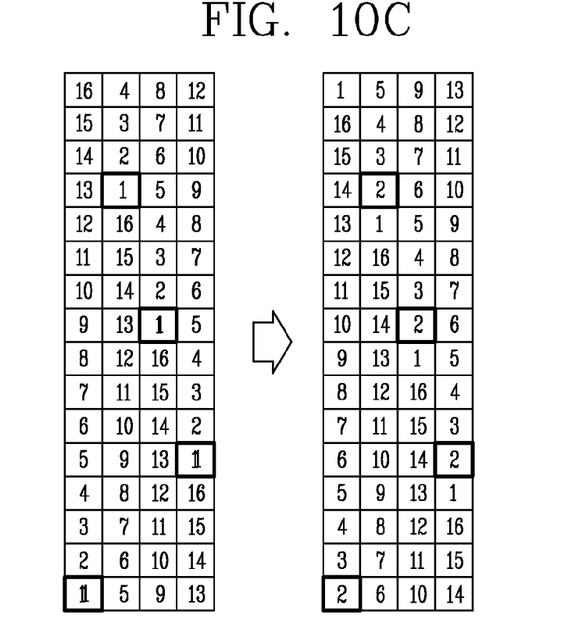
Figure 10D:
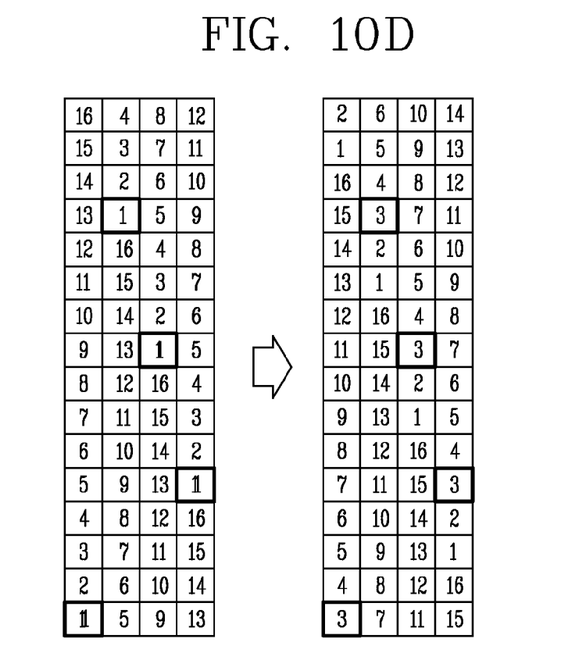

In this way, resetting of the view map for each of blocks B1, B1', B2, and B2' is determined differently depending on the degree of bending of each of the blocks B1, B1', B2, and B2'. When the display panel 110 is bent at a certain curvature as illustrated in FIG. 9, the view images are sequentially moved and written to the pixels as they are away from the middle block B0. For example, in the case of the first blocks B1 and B1' adjacent to the middle block B0, the view image moves once (i.e., movement from the first view image '1' to the sixteenth image '16' or the second view image '2', as illustrated in FIGS. 10A and 10C). However, in the case of the second blocks B2 and B2' disposed farther away from the middle block B0 relative to the first blocks B1 and B1', the view image moves twice (i.e., movement from the first image '1' to the fifteenth view image '15' or the third view image '3', as illustrated FIGS. 10B and 10D).

However, the present invention is not limited to the above-described resetting method of the view map, and the number of movements of the view images can be determined depending on the degree of bending of the display panel 110.

Next, the display panel 110 displays images based on the image data rearranged according to the reset view map through the data drive unit (S150).

As a result, a 3D cross-talk caused by superimposition of other view images that may occur because of the bending of the display panel 110 can be reduced. Accordingly, the 3D image quality can be maintained despite of the bending of the display panel 110, thereby improving image quality.

As describe above, a bendable stereoscopic 3D display device according to an embodiment of the present invention is characterized that, while maintaining the existing optical design by interlocking with the bending information of the display panel, the display panel is divided into a plurality of blocks, the view map is reset based on a degree of bending for each of the blocks, and then the image data is rearranged, thereby reducing a 3D cross-talk caused by superimposition of other view images that may occur because of a bending of the display panel. Accordingly, the 3D image quality can be maintained despite of the beding of the display panel, thereby improving image quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A bendable stereoscopic 3D display device, comprising:
a display panel including a plurality of left-eye pixels and a plurality of right-eye pixels, the display panel being divided into a reference block and a plurality of blocks outside the reference block;

a separator on the display panel to transmit or block images output from the left-eye pixels and the right-eye pixels;

a timing controller to receive an image data and a timing signal for driving the display panel; and a control unit to receive a bending information on each of the plurality of blocks when there is a change in curvature of the display panel, reset a view map of each of the plurality of blocks based on a degree of bending, and then rearrange the image data based on the reset view map, wherein a number of views in each of the plurality of blocks is modified so that a view information of at least one of the plurality of blocks substantially matches that of the reference block, and wherein the view map is a coordinate information of a viewing region in which a stereoscopic image output can be viewed.

2. The device according to claim 1, wherein the control unit is included in the timing controller.

3. The device according to claim 1, further comprising a sensor unit to extract the bending information on each block, wherein the control unit determines the degree of bending for each block based on the bending information, reset the view map of each block based on the degree of bending, and then rearrange the image data based on the reset view map.

4. The device according to claim 3, wherein the control unit includes a look-up table storing a plurality of optimal view maps in connection with positions of a viewer and degrees of bending of the blocks, and wherein the control unit resets the view map of each block based on the optimal view maps stored in the look-up table.

5. The device according to claim 1, wherein the control unit includes an image data arrange unit to rearrange the image data, and wherein the control unit rearranges the image data, when the image data arrange unit receives an output stop control signal.

6. The device according to claim 3, wherein the sensor unit includes a plurality of sensor electrodes, and wherein the bending information is extracted by detecting a change in electrostatic capacities or resistances of the sensor electrodes.

7. The device according to claim 1, wherein the separator includes a lenticular lens plate with a plurality of lenticular lenses, and wherein the plurality of lenticular lenses are inclined with respect to a pixel direction defining the plurality of left-eye pixels and the plurality of right-eye pixels of the display panel.

8. The device according to claim 1, wherein the control unit resets the view map of each block so that an entire view map of the display panel substantially matches a view map of the reference block.

9. A method for driving a bendable stereoscopic 3D display device, the method comprising:

dividing a display panel into a reference block and a plurality of blocks outside the reference block;

providing a separator on the display panel;

receiving a bending information on each of the plurality of blocks of the display panel, when there is a change in curvature of the display panel;

resetting a view map of each of the plurality of blocks based on a degree of bending; and rearranging image data based on the reset view map, wherein a number of views in each of the plurality of blocks is modified so that a view information of at least one of the plurality of blocks substantially matches that of the reference block, and wherein the view map is a coordinate information of a viewing region in which a stereoscopic image output can be viewed.

10. The method according to claim 9, wherein resetting the view map includes selecting an optimal view map stored in a look-up table based on at least one of the optimal view maps stored in the look-up table.

11. The method according to claim 10, wherein the look-up table stores a plurality of optimal view maps in connection with positions of a viewer and degrees of bending of the blocks.

12. The method according to claim 9, wherein receiving the bending information includes detecting a change in electrostatic capacities or resistances of a plurality of sensor electrodes.

13. The method according to claim 9, wherein resetting the view map of each block is such that an entire view map of the display panel substantially matches a view map of the reference block.

14. The method according to claim 9, wherein resetting the view map is such that an increase in a number of views is different depending on a location of each block from the reference block.

15. The method according to claim 14, wherein as the location of each block is further away from the reference block, the increase in a number of views is greater.

16. The method according to claim 15, wherein the display panel is curved to be concave toward a viewer.

17. The method according to claim 9, wherein the image data is previously converted into a multi-view format before being reset based on the view map, and wherein a number of multi-views is equal to or greater than 2.

* * * * *